US007720850B2

(12) United States Patent
Lu et al.

(10) Patent No.: US 7,720,850 B2
(45) Date of Patent: May 18, 2010

(54) SELF-UPLOADED INDEXING AND DATA CLUSTERING METHOD AND APPARATUS

(75) Inventors: Charles Lu, Fremont, CA (US); Sadashiv Adiga, Hercules, CA (US)

(73) Assignee: Campus 1, Inc., Fremont, CA (US)

( * ) Notice: Subject to any disclaimer, the term of this patent is extended or adjusted under 35 U.S.C. 154(b) by 284 days.

(21) Appl. No.: 11/441,591

(22) Filed: May 26, 2006

(65) Prior Publication Data
US 2007/0276880 A1 Nov. 29, 2007

(51) Int. Cl.
*G06F 7/00* (2006.01)
*G06F 17/30* (2006.01)
(52) U.S. Cl. ...................................... 707/741
(58) Field of Classification Search ................ 707/203
See application file for complete search history.

(56) References Cited

U.S. PATENT DOCUMENTS

| | | | | |
|---|---|---|---|---|
| 6,243,750 B1* | 6/2001 | Verma | .................... | 709/224 |
| 2002/0174089 A1* | 11/2002 | Tenorio | ..................... | 707/1 |
| 2002/0184111 A1* | 12/2002 | Swanson | ................. | 705/26 |
| 2003/0149706 A1* | 8/2003 | Neal et al. | ............... | 707/104.1 |
| 2003/0195877 A1* | 10/2003 | Ford et al. | ................ | 707/3 |
| 2005/0120006 A1* | 6/2005 | Nye | ............................ | 707/3 |

* cited by examiner

*Primary Examiner*—Mohammad Ali
*Assistant Examiner*—Alexey Shmatov
(74) *Attorney, Agent, or Firm*—Raj Abhyanker LLP

(57) ABSTRACT

A self-uploaded indexing and data clustering method and apparatus. In one embodiment, a method of a server device includes processing a merchant-uploaded inventory data to determine a set of meta-data attributes associated with the merchant-uploaded inventory data and creating an index data using the set of meta-data attributes associated with the merchant-uploaded inventory data. The merchant-uploaded inventory data may be compared with a previous inventory data of a particular merchant associated with both the merchant-uploaded inventory data and the previous inventory data to identify at least a portion of the set of meta-data attributes which do not need to be updated. The index data may be created using an incremental algorithm that builds on preexisting indexes which have substantially similar data as the index data and wherein the incremental algorithm builds on preexisting indexes by infusing into preexisting indexes the set of meta-data attributes associated with the merchant-uploaded inventory data other than the portion of the set of meta-data attributes which do not need to be updated.

1 Claim, 12 Drawing Sheets

| MERCHANT DEVICE 104 | SERVER DEVICE 100 | CLIENT DEVICE 106 |
|---|---|---|
| COMMUNICATE AN INVENTORY DATA TO A SERVER DEVICE 500 | CONVERT THE INVENTORY DATA TO A STRUCTURED FORMAT 502 | |
| | PROCESS THE INVENTORY DATA AND CREATE AN INDEX 504 | |
| | ANALYZE THE USER QUERY USING THE INDEX TO CREATE A QUERY RESPONSE 508 | COMMUNICATE A USER QUERY 506 |
| | SELECTIVELY GROUP THE QUERY RESPONSE TO CREATE DATA CLUSTERS 510 | |
| | ORGANIZE THE DATA CLUSTERS ACCORDING TO POPULARITY OF ITEM (E.G., BASED ON A COUNT OF VARIOUS MERCHANTS OFFERING THE ITEM) 512 | |
| | GENERATE A TRANSACTION DATA BASED ON THE SELECTION 516 | MAKE AN INFORMED SELECTION USING THE DATA CLUSTERS 514 |
| PROCESS THE TRANSACTION DATA AND PROCESS CONSIDERATION OF CLIENT DEVICE 518 | | |

FIGURE 5

SELF-UPLOADED INDEXING AND DATA CLUSTERING METHOD AND APPARATUS

FIELD OF TECHNOLOGY

This disclosure relates generally to the technical fields of software technology and, in one example embodiment, to a self-uploaded indexing and data clustering method and apparatus.

BACKGROUND

A potential buyer may search (e.g., through an Internet) for merchandise through a variety of mechanisms (e.g., querying a search engine, querying a merchant website, etc.). In addition, a seller (e.g., a merchant, a trader, etc.) may offer merchandise for sale through the variety of mechanisms (e.g., by listing on search engines, trade websites, etc.). The seller may not be able to offer his/her entire inventory for search to a potential buyer (e.g., due to financial and/or operational reasons).

A search engine provider may execute a search (e.g., based on the query posted by the potential buyer for a particular merchandise) by querying a finite number of sources (e.g., online merchant stores, web pages, etc.) within a finite amount of time (e.g., as set and/or determined by the search engine provider). However, all the sources may not be able to respond to a search engine query in the allotted time period (e.g., due to internet traffic congestions, slow servers, delay in response time, etc.). As a result, the potential buyer may have limited options (e.g., due to a limited data set provided by the search engine provider) to form his/her decision. The potential buyer may also have to wait for the entire duration that a search engine takes to execute its search.

In addition, the search engine may generate a sizeable response (e.g., large number of items) to the search engine query posted by a prospective buyer. The potential buyer may not have the time and/or skills to analyze and/or process the sizable response to reach an informed decision. Moreover, the potential buyer may be presented with options that might not be to his/her liking (e.g., the search response may have obsolete items). As a result the potential buyer may decide to postpone and/or call off his/her purchase decisions.

SUMMARY

A self-uploaded indexing and data clustering method and apparatus are disclosed. In one aspect a method of a server device includes processing a merchant-uploaded inventory data to determine a set of meta-data attributes associated with the merchant-uploaded inventory data and creating an index data using the set of meta-data attributes associated with the merchant-uploaded inventory data. The merchant-uploaded inventory data may be converted to a structured format prior to the processing of the merchant-uploaded inventory data having the set of meta-data attributes. The merchant-uploaded inventory data may be compared with a previous inventory data of a particular merchant associated with both the merchant-uploaded inventory data and the previous inventory data to identify at least a portion of the set of meta-data attributes which do not need to be updated.

The merchant-uploaded inventory data may be parsed to extract the set of meta-data attributes associated with the merchant-uploaded inventory data. The set of meta-data attributes may be an item identifier, a merchant identifier, an item description, an item price and/or an item brand. The index data may be created using an incremental algorithm that builds on preexisting indexes which have substantially similar data as the index data. The incremental algorithm may build on preexisting indexes by infusing into preexisting indexes the set of meta-data attributes associated with the merchant-uploaded inventory data other than the portion of the set of meta-data attributes which do not need to be updated.

An incentive data tailored to a merchant associated with the merchant-uploaded inventory data may be generated to encourage the merchant to periodically communicate revised versions of an inventory of the merchant to the server device. The incentive data may be a financial incentive data, a marketing incentive data and/or an operational incentive data.

In another aspect a method of a server device includes analyzing a query of a client device using an index data to determine a set of meta-data attributes of the index data that match the query, pooling the set of meta-data attributes of the index data to generate a query response, selectively grouping the set of meta-data attributes of the query response to generate a set of data clusters and generating a rank of the set of data clusters based on a count of various merchants offering a particular item associated to the set of data clusters.

Selective grouping of the query response may be based on application of at least one grouping algorithm that logically associates certain items with other items through an algorithm (e.g., a neural network algorithm) that examines and generates a meta-data associated with each of the certain items simultaneously to the generation of the data clusters. The set of meta-data attributes of the index may be associated to an inventory data communicated by a merchant device. A mark-up language file may be automatically populated using the set of data clusters through a client interaction module that generates a visual data structuring having a set of rows and a set of columns that logically group items of different ones of the set of data clusters based on the count of various merchants having the items in the different ones of the set of data clusters.

A transaction data may be generated based on a user selection of the particular item associated to the set of data clusters and the transaction data may be communicated to a elected merchant offering the particular item. A tracking data may be embedded through a redirection of the transaction data to a mark-up language document external to the merchant device and a statistical data of referral rates to the elected merchant may be generated through the tracking data. A payment of an interested party may be processed when the mark-up language file develops a patron base above a threshold value and a subscription service may be offered on the mark-up language file associated with the interested party when the patron base is above the threshold value. The subscription service may be an advertisement space, a sponsored recommendation and/or a web feature.

In yet another aspect, a system includes a server device to create an index data using a set of meta-data attributes associated with an inventory data and to generate at least one grouping through a cluster algorithm that logically organizes data resultant from a query response of a user, a merchant device to uni-directionally communicate the inventory data to the server device to improve a search result of at least some item data embedded in the inventory data and a client device to render a representation of the grouping and to communicate a query to the server device. The grouping of the query response may be based on selective association of the set of meta-data attributes associated with individual item matches resultant from the query response of the user.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is an interaction diagram of a process flow between the server device, the merchant device and the client device, according to one embodiment.

Other features of the present embodiments will be apparent from the accompanying drawings and from the detailed description that follows.

DETAILED DESCRIPTION

A self-uploaded indexing and data clustering method and apparatus is disclosed. In the following description, for the purposes of explanation, numerous specific details are set forth in order to provide a thorough understanding of the various embodiments. It will be evident, however to the one skilled in the art that the various embodiments may be practiced without these specific details. An example embodiment provides methods and systems of a server device 100 (as illustrated in FIG. 1) to process a merchant-uploaded inventory data (e.g., stock and/or supply data) to determine a set of meta-data attributes 412 (e.g., the set of meta-data attributes 412 of FIG. 4) associated with the merchant-uploaded inventory data and to create an index data 110 (e.g., the index data 110 of FIG. 1) using the set of meta-data attributes associated with the merchant uploaded inventory data.

Figure 1:
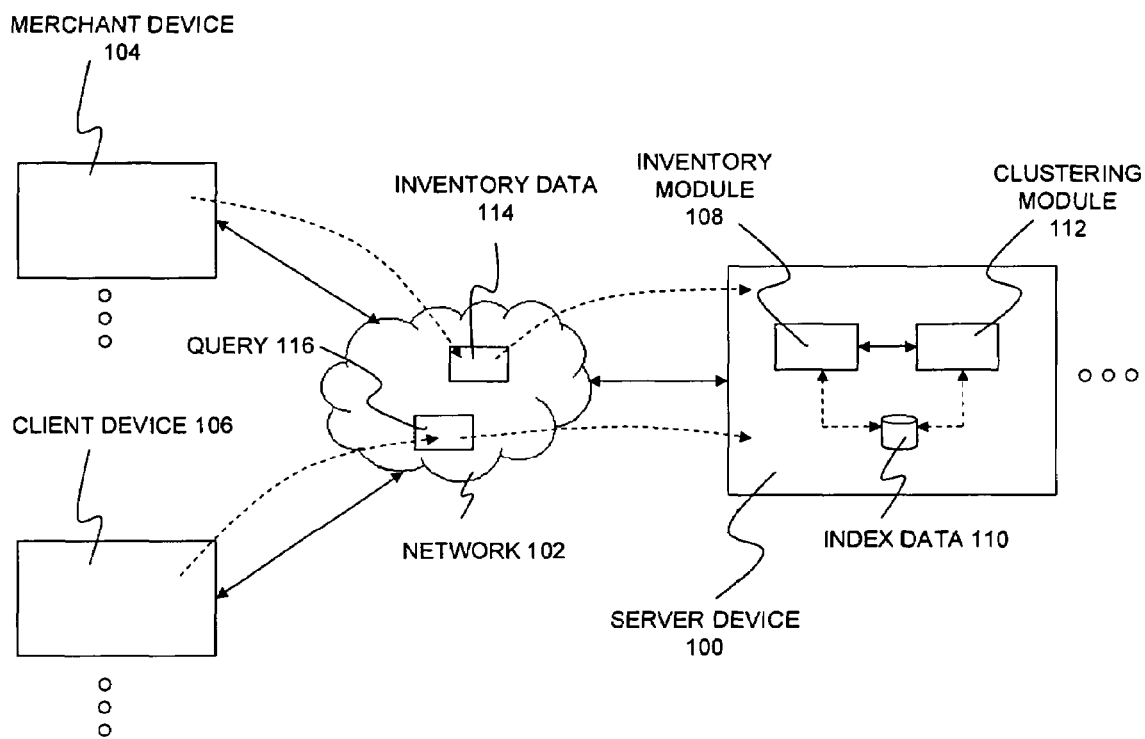
FIG. 1 is a network view of a server device communicating with a merchant device and a client device through a network, according to one embodiment.

Another example embodiment provides methods and systems of a server device 100 (as illustrated in FIG. 1) to analyze a query 116 (e.g., the query 116 of FIG. 1) of a client device 106 (e.g., as illustrated in FIG. 1) using an index data 110 to determine a set of meta-data attributes 412 of the index data 110 that match the query 116, pool the set of meta-data attributes 412 of the index data 110 to generate a query response 800 (e.g., the query response 800 of FIG. 8), selectively group the set of meta-data attributes 412 of the query response 800 to generate a set of data clusters 802 (e.g., the set of data clusters 802 of FIG. 8) and to generate a rank 804 (e.g., the rank 804 of FIG. 8) of the set of data clusters 802 based on a count of various merchants 812 (e.g., the count of various merchants 812 of FIG. 8) offering a particular item associated to the set of data clusters 802.

An additional example embodiment provides methods and systems of a server device 100 to create an index data 110 using a set of meta-data attributes 412 associated with an inventory data 114 (e.g., the inventory data 114 of FIG. 1) and to generate at least one grouping through a cluster algorithm that logically organizes data resultant from a query response 800 of a user, a merchant device 104 (as illustrated in FIG. 1) to uni-directionally communicate the inventory data 114 to the server device 100 to improve a search result of at least some item data embedded in the inventory data 114 and a client device 106 to render a representation of the grouping and to communicate a query to the server device 100. It will be appreciated that the various embodiments discussed herein may/may not be the same embodiment, and may be grouped into various other embodiments not explicitly disclosed herein.

FIG. 1 is a network diagram of a server device 100, a merchant device 104, and a client device 106 communicating an inventory data 114 and a query 116 through a network 102 (e.g., an internet network, a wide area network, a local area network, etc.), according to one embodiment. In one embodiment, the merchant device 104 (e.g., a store selling merchandise over the internet, an individual offering merchandise online, etc.) uni-directionally (e.g., in a one-way direction) communicates the inventory data 114 (e.g., data pertaining to inventory, stock and/or supply of items that a merchant may offer for sale) to the server device 100 to improve a search result (e.g., enhance the outcome of a search query posted by a prospective buyer) of at least some item data embedded in the inventory data 114.

The server device 100 may include an inventory module 108 and/or a clustering module 112 according to one embodiment. In one embodiment, the inventory module 108 creates an index data 110 (e.g., an organized collection of item information communicated by the merchant device 104) using a set of meta-data attributes 412 (e.g., the set of meta-data attributes 412 of FIG. 8) associated with an inventory data 114. The inventory module 108 may be best understood with reference to FIG. 2, as will later be described. The clustering module 112 generates at least one grouping through a cluster algorithm (e.g., as illustrated in FIG. 3) that logically organizes data resultant from a query response 800 (e.g., the query response 800 of FIG. 8) of a user (e.g., a prospective buyer, an internet surfer, etc.). The clustering module 112 may be best understood with reference to FIG. 3. The client device 106 renders a representation of the grouping and communicates a query 116 (e.g., a search request) to the server device 100, according to one embodiment. Additional details of FIG. 1 are best understood with reference to FIG. 2 and FIG. 3.

Figure 2:
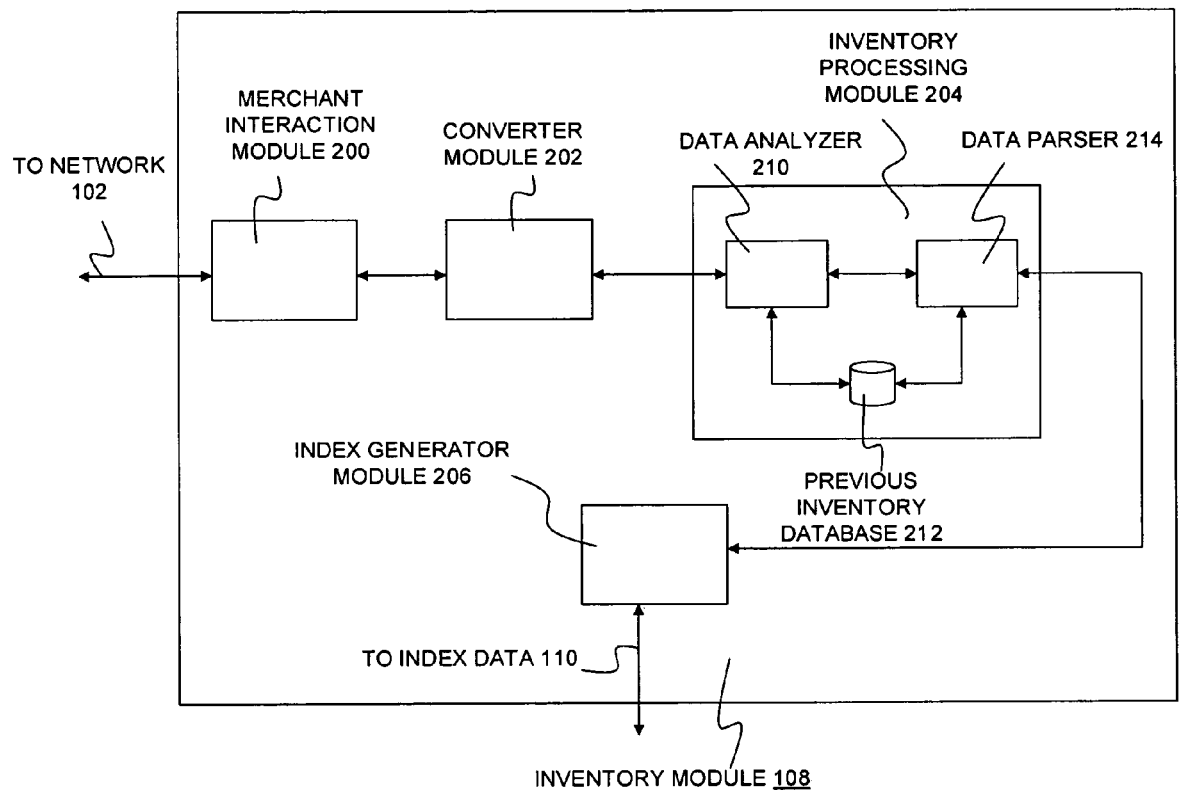
FIG. 2 is an exploded view of an inventory module of FIG. 1, having merchant interaction module, a converter module, a cooker module, and an index generator module, according to one embodiment.
Figure 3:
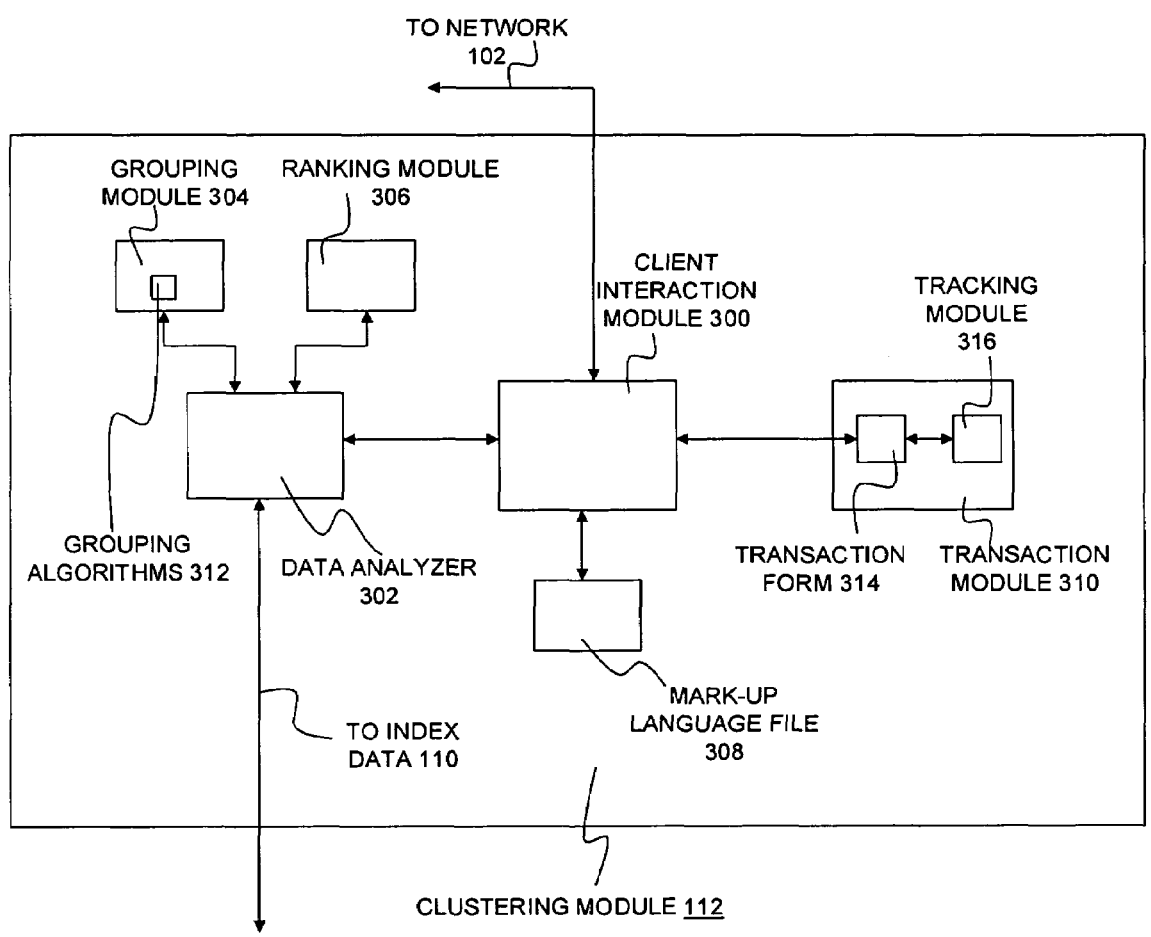
FIG. 3 is an exploded view of a clustering module of FIG. 1 having a grouping module, a ranking module and a transaction module, according to one embodiment.

FIG. 2 is an exploded view of the inventory module 108 of FIG. 1 having a merchant interaction module 200, a converter module 202, an inventory processing module 204 and/or an index generator module 206 according to one embodiment. The merchant interaction module 200 may serve as a platform to facilitate interaction between the merchant device 104 and the server device 100. In one embodiment, the merchant device 104 may uni-directionally communicate the inventory data 114 to the server device 100 through the merchant interaction module 200 (e.g., by using an inventory upload feature). An incentive data tailored to a merchant (e.g., a store selling merchandise over the internet, an individual offering merchandise online, etc.) associated with a merchant-uploaded inventory data (e.g., the inventory data 114 of FIG. 1) may be generated to encourage the merchant to periodically communicate revised versions of an inventory (e.g., list of items held by a merchant) of the merchant to the server device 100 (e.g., the server device 100 of FIG. 1), according to one embodiment. The incentive data may be a financial incentive data (e.g., a cost benefit), a marketing incentive data (e.g., special promotional benefit), and/or an operational incentive data (e.g., benefits in day to day operations). Other feature(s) of the merchant interaction module 200 are best understood with reference to FIG. 7, as will later be described.

The converter module 202 may convert the merchant-uploaded inventory data (e.g., the inventory data 114 communicated by the merchant device 104 through the merchant interaction module 200) to a structured format (e.g., an organized format and/or a process conducive format) prior to processing of the merchant-uploaded inventory data having the set of meta-data attributes (e.g., the set of meta-data attributes 412 of FIG. 4), according to one embodiment. The inventory processing module 204 may include a data analyzer 210, a previous inventory database 212 and/or a data parser 214, according to one embodiment. In one embodiment the server device 100 processes (e.g., by using a processor 602 of FIG. 6) a merchant-uploaded inventory data (e.g., the inventory data 114 of FIG. 1) to determine a set of meta-data attributes 412 (e.g., the set of meta-data attributes 412 of FIG. 4) associated with the merchant-uploaded inventory data.

Particularly the set of meta-data attributes 412 may be determined by the data analyzer 210 by referencing the previous inventory database 212 and carrying out a comparative analysis of the inventory data 114 (e.g., comparison of attributes associated to an inventory data uploaded by a merchant to attributes associated to a previous inventory data of the same merchant) to identify at least a portion of the set of meta-data attributes 412 which do not need to be updated (e.g., meta-data attributes that are common and/or similar in both the inventory data 114 and the previous inventory data of the previous inventory database 212). The set of meta-data attributes 412 determined by the data analyzer 210 may then be parsed (e.g., extracted) from the inventory data 114 using the data parser 214.

The index generator module 206 may generate an index data 110 based on a feed (e.g., processed data) supplied by the inventory processing module 204 (e.g., as such the index data 110 may be a "self service" index, in that it may be self-refreshed using data uploaded by merchants whenever they want the index to be refreshed). In one embodiment the server device 100 (e.g., the server device 100 of FIG. 1) creates an index data 110 using the set of meta-data attributes 412 (e.g., the set of meta-data attributes 412 determined by the data analyzer 210) associated with the merchant-uploaded inventory data (e.g., the inventory data 114 of FIG. 1). Particularly the index generator module 206 may create the index data 110 by using an incremental algorithm to infuse (e.g., introduce) the set of meta-data attributes 412 (e.g., the set of meta-data attributes determined by the inventory processing module 204) into a preexisting index (e.g., an index having substantially similar data as the index data 110).

FIG. 3 is an exploded view of the clustering module 112 of FIG. 1 having a client interaction module 300, a data analyzer 302, a grouping module 304, a ranking module 306, a mark-up language file 308 and/or a transaction module 310, according to one embodiment. The client interaction module 300 servers as in interface between the client device 106 (e.g., the client device 106 of FIG. 1) and the merchant device 104 (e.g., the merchant device 104 of FIG. 1). First a query 116 (e.g., a search request) is posted by a user (e.g., a prospective buyer) to the server device 100 through the client interaction module 300.

In one embodiment, the query 116 of the client device 106 is analyzed using an index data 110 to determine a set of meta-data attributes 412 of the index data 110 that match the query 116. Particularly the query 116 is received by the data analyzer 302 and analyzed and/or processes (e.g., by using the processor 602 of FIG. 6) by comparing the query 116 to the index data 110 (e.g., comparison of specific keywords in a query to the content associated to the index data 110) to identify and/or determine the set of meta-data attributes 412 (e.g., extract and/or determine product identifier, product description, product brand, etc. associated to item(s) from the index data 110) that match (e.g., correspond) to the query 116. The data analyzer 302 may then pool (e.g., generate a collection) the set of meta-data attributes 412 (e.g., the set of meta-data attributes that matched the query 116) to create a query response 800 (e.g., the query response 800 of FIG. 8).

The grouping module 304 may include a grouping algorithm(s) 312 required to process the query response 800. The data analyzer 302 may reference the grouping algorithm(s) 312 present in the grouping module 304 to selectively group the set of meta-data attributes 412 of the query response 800 to create a set of data clusters 802 (e.g., the set of data clusters 802 of FIG. 8), according to one embodiment. Specifically the grouping of the set of meta-data attributes 412 of the query response 800 is based on application of one or more grouping algorithms (e.g., applied simultaneously and/or sequentially) to logically associate certain items with other items (e.g., relating different items by grouping based on item identifier, item description and/or item brand associated to the item(s)) through a neural network algorithm that examines and generates a meta-data associated with each of the certain items simultaneously to the generation of data clusters 912 (e.g., the data clusters 912 of FIG. 9).

Figure 8:
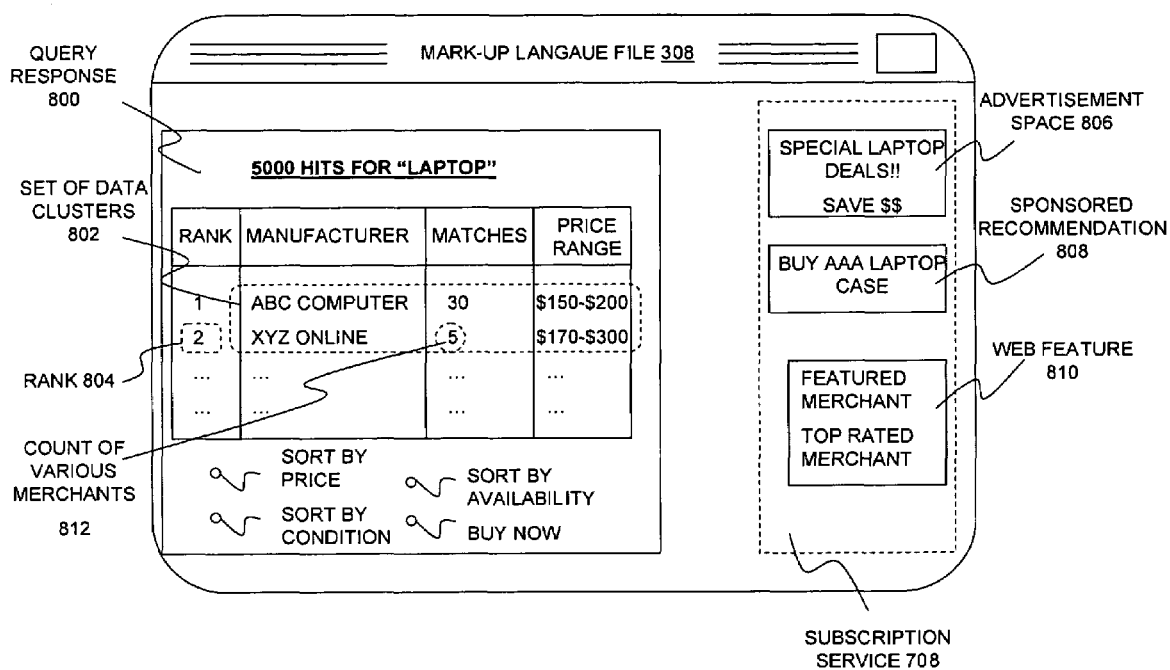
FIG. 8 is a user interface view of the mark-up language file of FIG. 3, according to one embodiment.

The ranking module 306 may generate a rank 804 (e.g., the rank 804 of FIG. 8) of the set of data clusters 802 (e.g., the set of data clusters 802 of FIG. 8) based on a count of various merchants 812 (e.g., the count of various merchants 812 of FIG. 8) offering a particular item associated to the set of data clusters 802. Particularly the data analyzer 302 may reference the ranking module 306 and communicate through the client interaction module 300 a visual data structuring have a set of rows and a set of columns (e.g., as illustrated in FIG. 8) that logically group items of different ones of the set of data clusters 802 based on the count of various merchants 812 having the items in the different ones of the set of data clusters 802 (e.g., based on item popularity gauged by the number of unique merchants offering and/or holding the particular item associated to the set of data clusters 802). The mark-up language file 308 (e.g., a web page) may be automatically populated with the set of data clusters 802 generated by the data analyzer 302 through the client interaction module 300.

The transaction module 310 may generate a transaction data (e.g., item information, shipping information, price information etc associated to a particular item) based on a user selection of the particular item (e.g., after studying the visual data on the mark-up language file 308) associated to the set of data clusters 802 and communicate the transaction data to a elected merchant (e.g., based on user selection of the item) offering the particular item, according to one embodiment. The transaction module may include a transaction form 314 and/or a tracking module 316, according to one embodiment. The transaction form 314 may be used to facilitate transaction(s) (e.g., by permitting a user to enter transaction data in the transaction form 314) between a user (e.g., a buyer) and the merchant device 104 (e.g., the merchant device 104 of FIG. 1) through the server device 100 (e.g., the server device 100 of FIG. 1).

In one embodiment, the tracking module 316 may embed (e.g., insert) a tracking data (e.g., data to keep count and/or trail of user transaction with a merchant through the server device 100) through a redirection of the transaction data to a mark-up language document (e.g., the transaction form 314) external to the merchant device 104 and generate a statistical data of referral rates 706 (e.g., the statistical data of referral rates 706 of FIG. 7) to the elected merchant (e.g., the merchant chosen based on user selection of an item) through the tracking data. The transaction module 310 may process a payment of an interested party (e.g., a merchant, a service vendor, etc.) when the mark-up language file 308 develops a patron base (e.g., a user base) above a threshold value (e.g., a set minimum) and may offer a subscription service 708 (e.g., the subscription service 708 of FIG. 7) on the mark-up language file 308 associated with the interested party when the patron base is above the threshold value, according to one embodiment.

Figure 4:
FIG. 4 is a table view of content of index data of FIG. 1, according to one embodiment.

FIG. 4 is a table view of content of index data 110 of FIG. 1, according to one embodiment. The table 400 in FIG. 4 may include an item description field 402, an item identifier field 404, a merchant identifier field 406, an item brand field 408 and/or an other field 410. A set of meta-data attributes 412 associated with the inventory data 114 (e.g., the inventory data 114 of FIG. 1) may be an item identifier (e.g., a SKU number, a UPC number, a model number, a part number etc.), an item description (e.g., item name, specification, etc.), a merchant identifier (e.g., an identity tag associated to a merchant) and/or an item brand (e.g., item make, manufacturer, etc.).

The item description field 402 may be a name and/or a description tag associated with an item. The item identifier field 404 may be reference identifier (e.g., information to identify and/or distinguish an item) associated with the item. The merchant identifier field 406 may be a reference tag associated to a particular merchant to keep a track of items offered by the particular merchant. The item brand field 408 may be a brand name and/or a brand description tag associated with an item. The other field 410 may indicate miscellaneous and/or additional information with and/or relevant to the item.

For example, two items are illustrated in FIG. 4 (e.g., 'Laptop' and 'Biography of John Doe'). The item 'Laptop' has a UPC value '2324', EAN value '2112', SKU value '54', part number value '2000UN', model number '1800' in the item identifier field 404 indicating reference identifier(s) (e.g., a universal product code, a european article number, a store keeping unit, item part number, item model number etc.) associated with 'Laptop'. The merchant identifier field 406 has a value '1' indicating the merchant reference number associated with the item 'Laptop'. The item brand field 408 has a value 'ABC Electronic' indicating the brand name associated with the item 'Laptop'. In addition item 'Laptop' includes 'X, Y' in the other field 410, indicating any supplemental information that may be relevant to the item 'Laptop'.

Item 'Biography of John Doe' has an ISBN value '32423' in the item identifier field 404 indicating the reference identifier (e.g., international standard book number) associated with 'Biography of John Doe'. The merchant identifier field 406 has a value '2' indicating the merchant reference number associated with the item 'Biography of John Doe'. The item brand field 408 has a value 'XYZ Books' indicating the publisher name associated with the item 'Biography of John Doe'. In addition item 'Biography of John Doe' includes 'Z, Y' in the other field 410, indicating any supplemental information that may be relevant to the item 'Biography of John Doe'.

FIG. 5 is an interaction diagram of a process flow between the merchant device 104, the server device 100 and the client device 106 of FIG. 1, according to one embodiment. In operation 500, inventory data may be communicated by the merchant device to the server device. In operation 502, the inventory data may be converted to a structured format by the server device. In operation 504, the inventory data may be processed by the server device to create an index. In operation 506, a user query may be communicated by the client device to the server device. In operation 508, the user query may be analyzed by the server device using the index to create a query response. In operation 510, the query response may be selectively grouped by the server device to create data clusters. In operation 512, the data clusters may be organized by the server device according to popularity of an item (e.g., based on a count of various merchants offering the item). In operation 514, an informed selection may be made by the client device using the data clusters. In operation 516 a transaction data may be generated by the server device based on the selection. In operation 518, the transaction data and the consideration of the client device may be processed by the merchant device.

Figure 6:
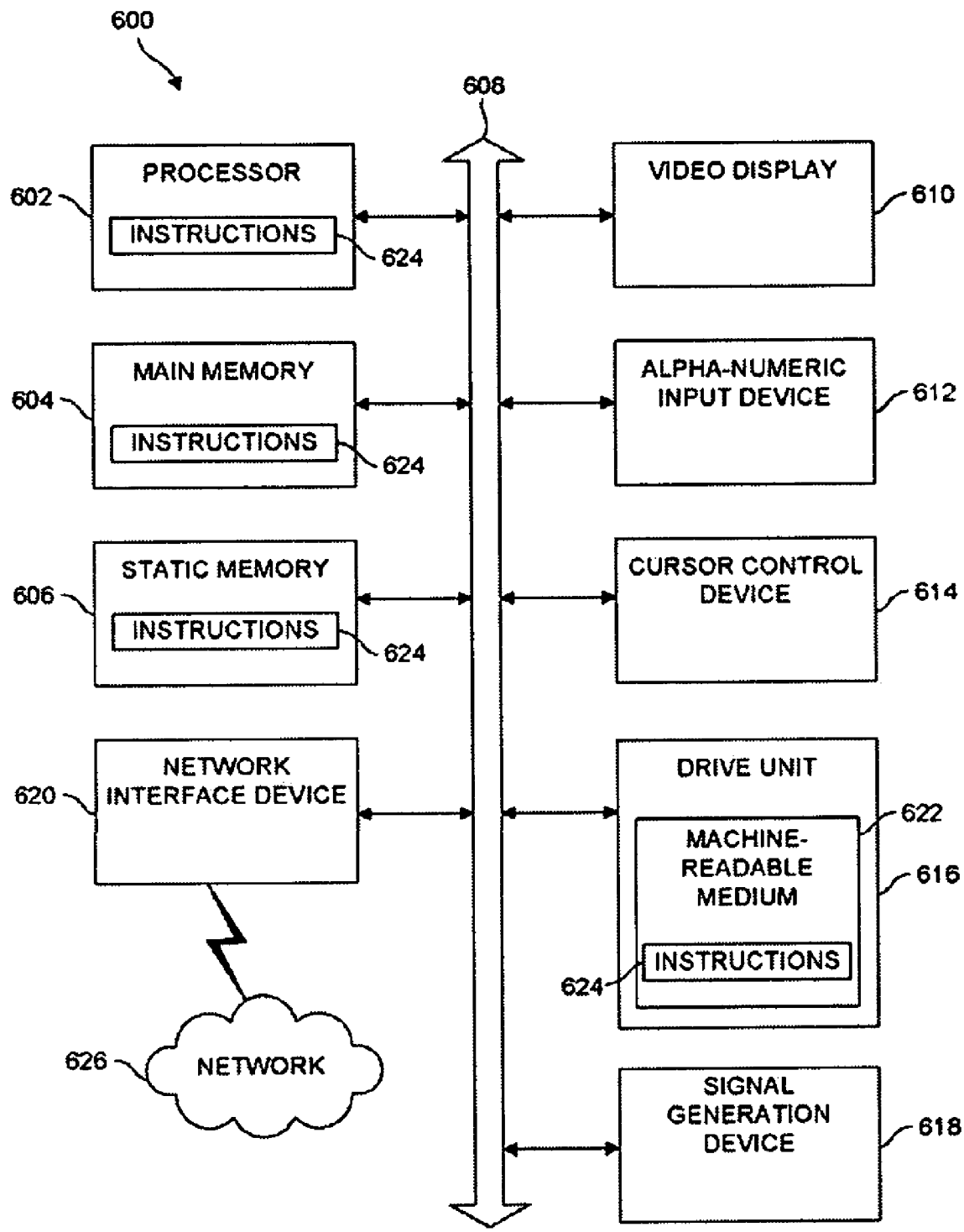
FIG. 6 is a diagrammatic representation of a data processing system capable of processing a set of instructions to perform any one or more of the methodologies herein, according to one embodiment.

FIG. 6 shows a diagrammatic representation of machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal display (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 7:
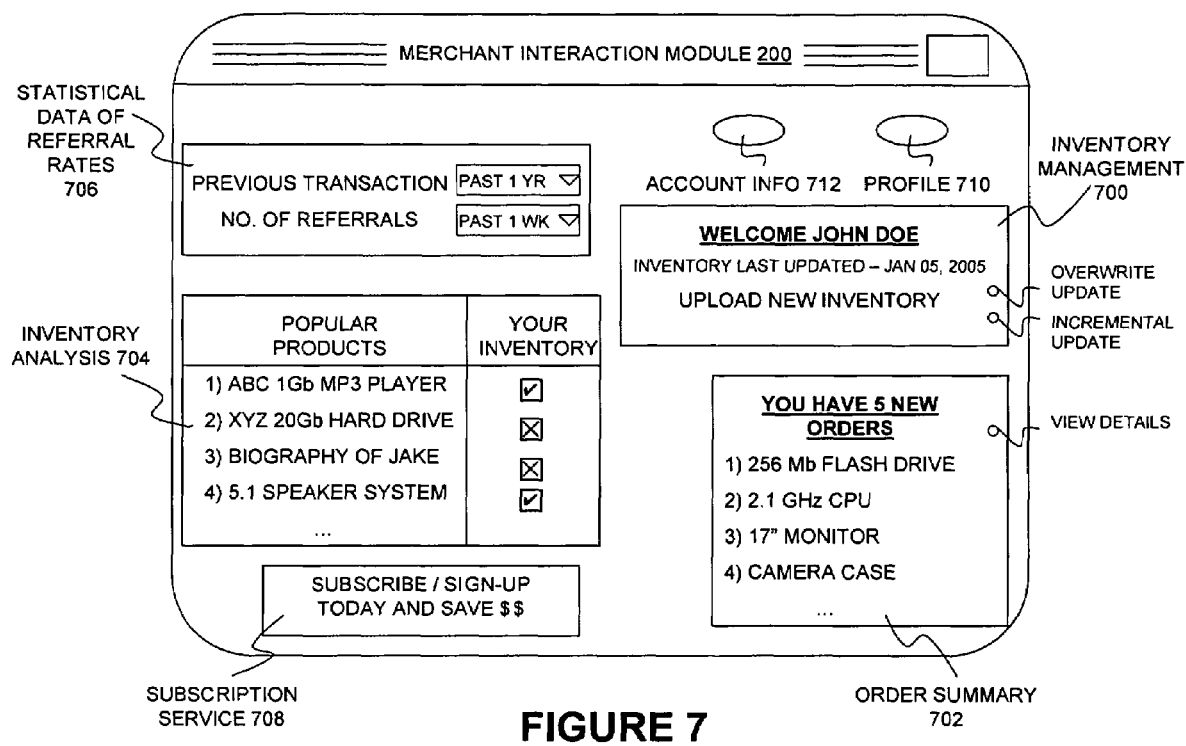
FIG. 7 is a user interface view of the merchant interaction module of FIG. 2, according to one embodiment.

FIG. 7 is a user interface view of the merchant interaction module 200 of FIG. 2, according to one embodiment. The user interface view may include an inventory management view 700, an order summary view 702, an inventory analysis view 704, a statistical data of referral rates 706, a subscription service 708, a profile view 710 and/or an account information view 712. The inventory management view 700 may provide a summary (e.g., a time stamp of last update, number of items uploaded, current inventory size, etc.) related to inventory data 114 (e.g., the inventory data 114 of FIG. 1) communicated by the merchant device 104.

The inventory management view 700 may also allow the merchant device 104 to upload inventory to the server device 100 through an incremental update (e.g., preserving the previous inventory and only updating the changes) and/or an overwrite update (e.g., overwriting the previous inventory). The order summary view 702 may provide a summary (e.g., a list and/or detailed information) of orders (e.g., items purchased by user(s)) generated from the transaction data based on selection of particular item(s) by the user(s) (e.g., a buyer). The inventory analysis view 704 may provide an analysis of the inventory data 114 uploaded by the merchant device 104. For example, the analysis may provide a list of particular items (e.g., popular items, fast selling items, items in demand, etc.) and compare the list to the inventory data 114 associated to a particular merchant to check if the particular merchant has the particular items (e.g., the popular item) in its inventory.

The statistical data of referral rates 706 provides a statistical analysis (e.g., number of user referrals, preference of users, etc.) of users referred to the merchant device 104 through the server device 100. The statistical analysis may be generated though a tracking data associated to the transaction data (e.g., as described in FIG. 3). The subscription service 708 may allow a merchant to sign-up and/or subscribe to a subscription service 708 (e.g., a paid service) offered by the server device 100. The subscription service 708 may be an advertisement space 806 (e.g., the advertisement space 806 of FIG. 8), a sponsored recommendation 808 (e.g., the sponsored recommendation 808 of FIG. 8) and/or a web feature 810 (e.g., the web feature 810 of FIG. 8). The account information view 712 may display subscription information about the merchant (e.g., balance, account preference, etc.). The profile view 710 may include data about the merchant (e.g., name, address, email address and/or transaction preference, etc.).

FIG. 8 is a user interface view of the mark-up language file 308 of FIG. 3, according to one embodiment. The user interface view may include a query response 800, a set of data clusters 802, a rank 804, an advertisement space 806, a sponsored recommendation 808, a web feature 810 and/or a count of various merchants 812. The query response 800 provides a summary (e.g., a result summary) of the query response 800 generated by the clustering module 112 (e.g., as described in FIG. 3) in response to a query 116 (e.g., the query 116 of FIG. 1) posted by a user. The set of data clusters 802 shows the data clusters (e.g., data clusters 912 of FIG. 9) generated from the query response 800. For example, the first cluster shows a 'laptop' manufactured by 'ABC Computer' with '30' matches (e.g., 30 different merchants offering the item) within a price range of '$150-$200'.

The rank 804 shows the rank for a particular data cluster. The rank 804 may be determined based on the count of various merchants 812 offering an item associated to the set of data clusters (e.g., as described in FIG. 3). For example, the data cluster for 'laptop' manufactured by 'ABC Computer' has a value of '30' as the count of various merchants 812 as compared to the 'laptop' manufactured by 'XYZ online' which has a value of '5' as the count of various merchants 812. Hence the data cluster for 'laptop' manufactured by 'ABC Computer' is ranked before the data cluster for 'laptop' manufactured by 'XYZ Online'.

The advertisement space 806 may be a place for displaying advertisements of an interested party (e.g., a merchant) who may have subscribed for subscription service 708 (e.g., the subscription service 708 of FIG. 7). The sponsored recommendation 808 may be an area on the mark-up language file 308 (e.g., the mark-up language file 308 of FIG. 3) for displaying recommendations (e.g., specific recommendations based on user query) of an interested party (e.g., a merchant) who may have signed-up for subscription service 708. The web feature 810 may be a section on the mark-up language file 308 to promote an interested party (e.g., through merchant ratings, special merchant features, etc.) who may have opted for subscription service.

Figure 9:
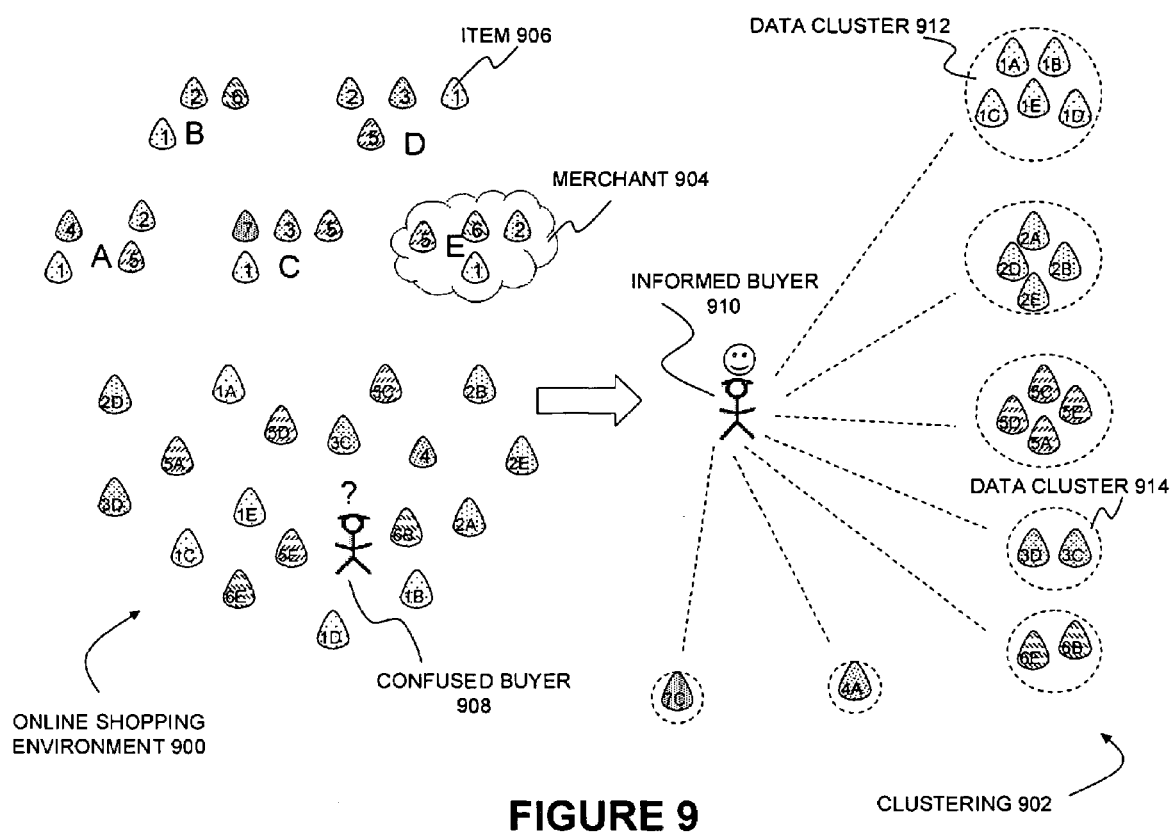
FIG. 9 is a graphical illustration to illustrate the effectiveness of clustering in an online shopping environment.

FIG. 9 is a graphical illustration to illustrate the effectiveness of data clustering in an online shopping environment. The online shopping environment 900 shows a clouded shopping environment where various merchants (e.g., merchant 'A', 'B', 'C', 'D', 'E', etc.) offer various items (e.g., item '1', '2', '3', '4', etc.). An item 906 may be offered by various merchants (e.g., item 1A, 1B, 1C etc where item 1A is item 1 offered by merchant A, item 1B is item 1 offered by merchant B and so on). Moreover, item '1', '2', '3', etc. may be variations of a similar item (e.g., a hard drive device with varying capacities) In such an environment it may be difficult for a user (e.g., a prospective buyer) to gauge, analyze and/or process this large amount of data to reach an informed decision. This may be characterized by a confused buyer 908.

A clustering 902 may be performed on the large amount of unorganized (e.g., chaotic) data to create data clusters. Data clusters 912 may be a collection of similar items (e.g., similar specification and/or similar brand like item '1') offered by a variety of merchants (e.g., merchant 'A', 'B', 'C', 'D' 'E' of FIG. 9). The set of data clusters 802 (e.g., the set of data clusters 802 of FIG. 8) may be a collection of different data clusters (e.g., like data clusters 912). Further, the set of data clusters 802 may be organized based on a popularity of a particular item (e.g., based on a count of various merchants offering the particular item).

For example, in FIG. 9 item '1' is offered by '5' merchants (e.g., merchant 'A', 'B', 'C', 'D' and 'E' as shown by data cluster 912) as compared to item '3' which is offered by '2' merchants (e.g., merchant 'C' and 'D' as shown by data cluster 914). This would provide for a higher ranking for the data cluster having item '1' (e.g., the data cluster 912) as compared to the data cluster of item '3' (e.g., the data cluster 914). Hence clustering 902, may provide the user with adequate assistance (e.g., by providing an organization and analysis of a large amount of data in the form of data clusters) to help him/her make an informed decision (e.g., as characterized by an informed buyer 910).

Figure 10:
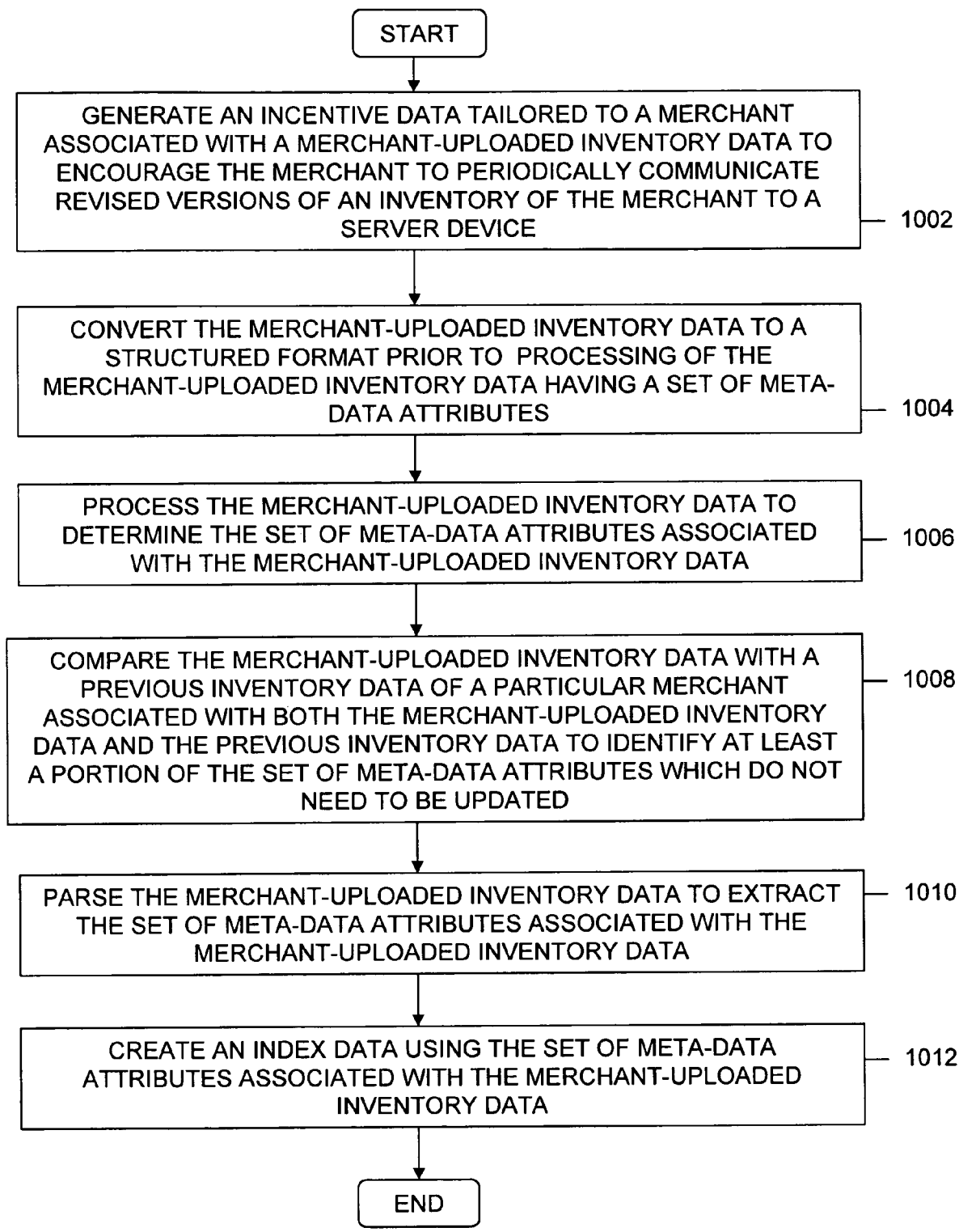
FIG. 10 is a flow chart illustrating a method to process a merchant-uploaded inventory data to create an index data, according to one embodiment.

FIG. 10 is a flow chart illustrating a method to process the merchant-uploaded inventory data (e.g., the inventory data 114 of FIG. 1) to create the index data 110 (e.g., the index data 110 of FIG. 1), according to one embodiment. In operation 1002, an incentive data tailored to a merchant (e.g., a store selling merchandise over the internet, an individual offering merchandise online, etc.) associated with a merchant-uploaded inventory data (e.g., the inventory data 114 of FIG. 1) may be generated to encourage the merchant to periodically communicate revised versions of an inventory (e.g., list of items held by a merchant) of the merchant to the server device 100 (e.g., the server device 100 of FIG. 1). In operation 1004, the merchant-uploaded inventory data may be converted to a structured format (e.g., an organized format and/or a process conducive format) prior to processing of the merchant-uploaded inventory data having a set of meta-data attributes 412 (e.g., the set of meta-data attributes 412 of FIG. 4).

In operation 1006, the merchant-uploaded inventory data may be processed to determine the set of meta-data attributes 412 associated with the merchant-uploaded inventory data (e.g., as described in FIG. 2). In operation 1008, the merchant-uploaded inventory data may be compared with a previous inventory data (e.g., the previous inventory data of the previous inventory database 212 of FIG. 2) of a particular merchant associated with both the merchant-uploaded inventory data and the previous inventory data to identify at least a portion of the set of meta-data attributes 412 which do not need to be updated (e.g., as described in the inventory processing module 204 of FIG. 2). In operation 1010, the merchant-uploaded inventory data (e.g., the inventory data 114 of FIG. 1) may be parsed to extract the set of meta-data attributes 412 associated with the merchant-uploaded inventory data. In operation 1012, a index data 110 (e.g., the index data 110 of FIG. 1) may be created using the set of meta-data attributes 412 associated with the merchant-uploaded inventory data (e.g., with the help of the index generator module 206 of FIG. 2).

Figure 11:
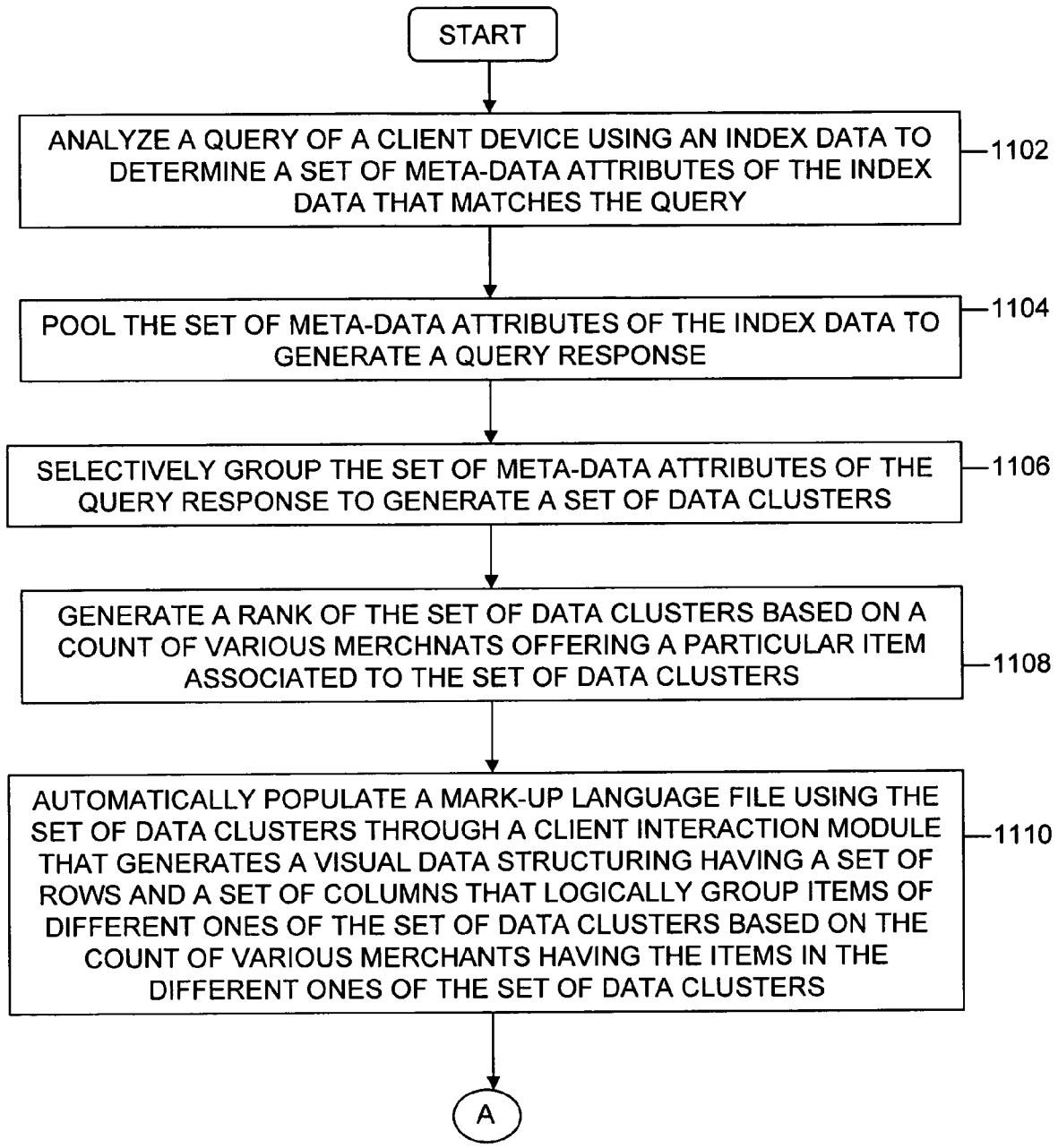
FIG. 11 is a flow chart illustrating a method to generate a query response based on a query of a client device, according to one embodiment.

FIG. 11 is a flow chart illustrating a method to generate a query response 800 (e.g., as illustrated in FIG. 8) based on a query 116 (e.g., the query 116 of FIG. 1) of a client device 106 (as illustrated in FIG. 1), according to one embodiment. In operation 1102, a query 116 of a client device 106 may be analyzed (e.g., by the data analyzer 302 of FIG. 3) using an index data 110 (e.g., the index data 110 of FIG. 1) to determine a set of meta-data attributes 412 of the index data 110 that match the query 116. In operation 1104, the set of meta-data attributes 412 of the index data 110 may be pooled (e.g., collected) to generate a query response 800. In operation 1106, the set of meta-data attributes 412 of the query response 800 may be selectively grouped (e.g., by using grouping algorithms) to generate a set of data clusters 802 (e.g., the set of data cluster 802 of FIG. 8).

In operation 1108, a rank 804 (e.g., as illustrated in FIG. 8) of the set of data clusters 802 may be generated based on a count of various merchants 812 (e.g., number of unique merchants) offering a particular item associated to the set of data clusters 802. In operation 1110, a mark-up language file 308 (e.g., the mark-up language file 308 of FIG. 3) may be automatically populated using the set of data clusters 802 through a client interaction module 300 (e.g., the client interaction module 300 of FIG. 3) that generates a visual data structuring having a set of rows and a set of columns (e.g., as illustrated in FIG. 8) that logically group items of different ones of the set of data clusters 802 based on the count of various merchants 812 (e.g., the count of various merchants 812 of FIG. 8) having the items in the different ones of the set of data clusters 802.

Figure 12:
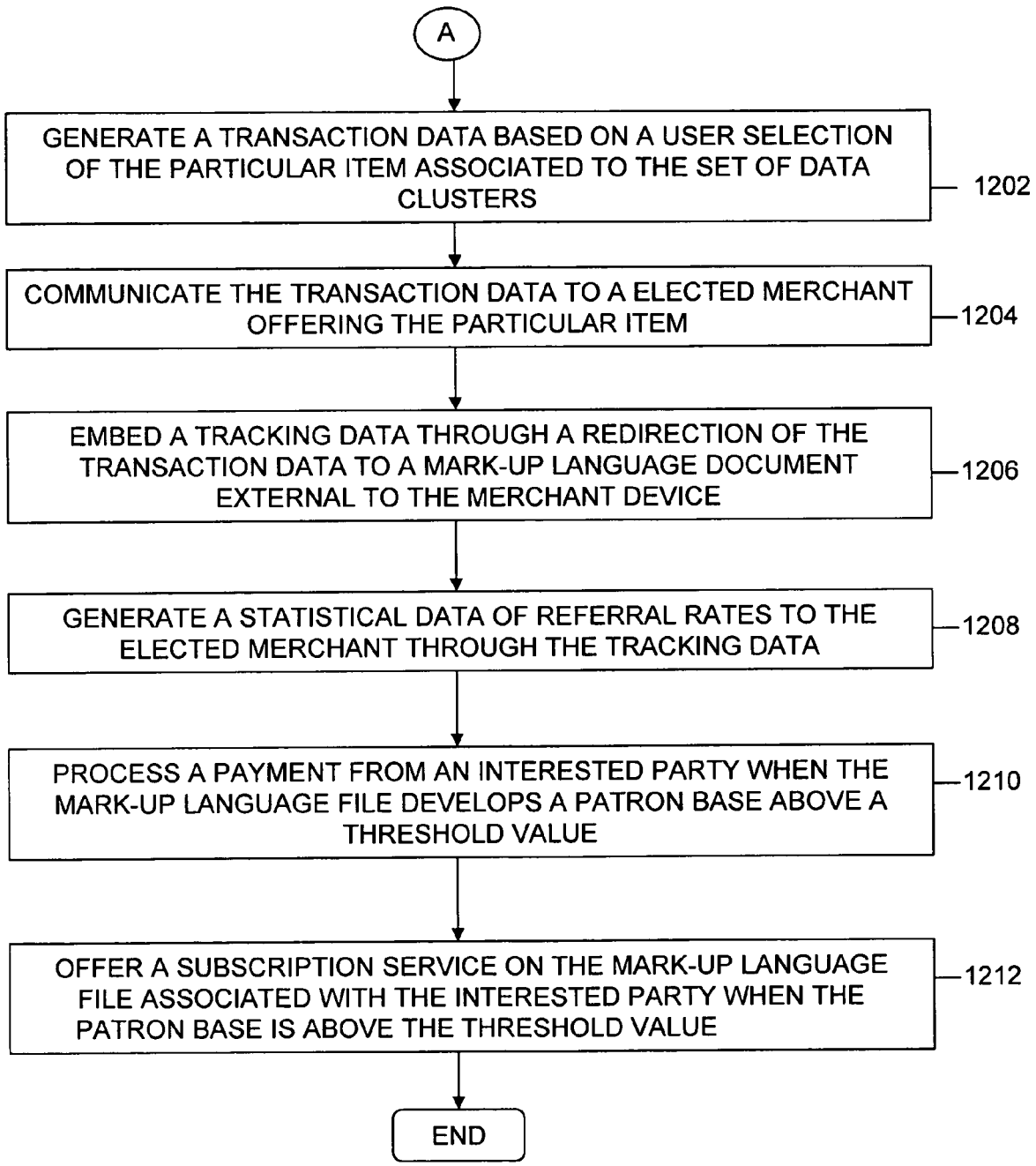
FIG. 12 is a process diagram that describes further the operations in FIG. 11, according to one embodiment.

FIG. 12 is a process diagram that describes further the operations of FIG. 11, according to one embodiment. FIG. 12 begins with a 'circle A' that connotes a continuation from operation 1112 of FIG. 11 (e.g., FIG. 11 concludes with the 'circle A'). First in operation 1202, a transaction data may be generated based on a user selection of a particular item associated to the set of data clusters (e.g., as described in FIG. 3). In operation 1204, the transaction data may be communicated to a elected merchant offering the particular item (e.g., as per the user selection). In operation 1206, a tracking data may be embedded through a redirection of the transaction data to a mark-up language document external to the merchant device 104 (e.g., the merchant device 104 of FIG. 1).

In operation 1208, a statistical data of referral rates 706 (e.g., as illustrated in FIG. 7) to the elected merchant may be generated through the tracking data. In operation 1210, a payment may be processed from an interested party when the mark-up language file 308 (e.g., the mark-up language file 308 of FIG. 3) develops a patron base (e.g., a user base) above a threshold value (e.g., above a set minimum). In operation 1212, a subscription service 708 (e.g., the subscription service 708 of FIG. 7) may be offered on the mark-up language file 308 associated with the interested party when the patron base is above the threshold value.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the inventory module 108 (and all the modules in the inventory module 108 as illustrated in FIG. 2) and/or the clustering module 112 (and all the modules within the clustering module 112 of FIG. 3), may be enabled using transistors, logic gates, and electrical circuits (e.g., application specific integrated ASIC circuitry) using a client circuit, a media requester circuit, a media processing circuit, a profile generator circuit, a relationship circuit, a override circuit, a transaction circuit, a widget generator circuit, a media update circuit, a media history circuit, and/or a media rating circuit.

In addition, it will be appreciated that the various operations, processes, and methods disclosed herein may be embodied in a machine-readable medium and/or a machine accessible medium compatible with a data processing system (e.g., a computer system), and may be performed in any order.

Accordingly, the specification and drawings are to be regarded in an illustrative rather than a restrictive sense.

What is claimed is:

1. A method of a server device comprising:

processing a merchant-uploaded inventory data using a processor of a server device to determine a set of meta-data attributes associated with the merchant uploaded inventory data;

creating an index data using the set of meta-data attributes associated with the merchant-uploaded inventory data;

analyzing a query of a client device using an index data to determine a set of metadata attributes of the index data that match the query;

pooling the set of meta-data attributes of the index data to generate a query response;

selectively grouping the set of meta-data attributes of the query response to generate a set of data clusters and wherein the set of meta-data attributes of the index are associated to an inventory data uni-directionally communicated by a merchant device, wherein selective grouping of the query response is based on applying of at least one grouping algorithm that logically associates certain items with other items through a neural network algorithm that examines and generates a meta-data associated with each of the certain items simultaneously to the generation of the data clusters, wherein the set of meta-data attributes of the index are associated to an inventory data communicated by a merchant device is associated with a merchant-uploaded inventory data and wherein the set of meta-data attributes are at least one of an item identifier, a merchant identifier, an item description, an item price, and an item brand;

generating a rank of the set of data clusters based on a count of various merchants offering a particular item associated to the set of data clusters;

processing a payment of an interested party when a mark-up language file develops a patron base above a threshold value;

offering a subscription service on the mark-up language file associated with the interested party when the patron base is above the threshold value, wherein the subscription service is at least one of an advertisement space, a sponsored recommendation and a web feature;

converting the merchant uploaded inventory data to a structured format prior to the processing of the merchant-uploaded inventory data having the set of meta-data attributes;

comparing the merchant uploaded inventory data with a previous inventory data of a particular merchant associated with both the merchant-uploaded inventory data and the previous inventory data to identify at least a portion of the set of meta-data attributes which do not need to be updated;

parsing the merchant-uploaded inventory data to extract the set of meta-data attributes associated with the merchant uploaded inventory data;

creating the index data using an incremental algorithm that builds on preexisting indexes which have substantially similar data as the index data and wherein the incremental algorithm builds on preexisting indexes by infusing into preexisting indexes the set of meta-data attributes associated with the merchant-uploaded inventory data other than the portion of the set of meta-data attributes which do not need to be updated; and generating an incentive data tailored to a merchant associated with the merchant-uploaded inventory data to encourage the merchant to periodically communicate revised versions of an inventory of the merchant to the server device, wherein the incentive data is at least one of a financial incentive data, a marketing incentive data and an operational incentive data;

automatically populating the mark-up language file using the set of data clusters through a client interaction module that generates a visual data structuring having a set of rows and a set of columns that logically group items of different ones of the set of data clusters based on the count of various merchants having the items in the different ones of the set of data clusters;

generating a transaction data based on a user selection of the particular item associated to the set of data clusters; and communicating the transaction data to a elected merchant offering the particular item;

embedding a tracking data through a redirection of the transaction data to a mark-up language document external to the merchant device; and generating a statistical data of referral rates to the elected merchant through the tracking data.

* * * * *